United States Patent [19]
Maida

[11] 4,340,289
[45] Jul. 20, 1982

[54] ERRONEOUS EXPOSURE PREVENTING DEVICE

[75] Inventor: Osamu Maida, Tokyo, Japan

[73] Assignee: Nippon Kogaku K.K., Tokyo, Japan

[21] Appl. No.: 126,351

[22] Filed: Mar. 3, 1980

[30] Foreign Application Priority Data

Mar. 8, 1979 [JP] Japan .................................. 54-26096

[51] Int. Cl.³ ........................ G03B 1/00; G03B 17/38
[52] U.S. Cl. .................................. 354/173; 354/214; 354/268
[58] Field of Search .............................. 354/170–173, 354/214, 268, 60 R; 352/124, 125, 173; 242/71.6

[56] References Cited
U.S. PATENT DOCUMENTS

3,999,197 12/1976 Iwashita .......................... 354/173

Primary Examiner—L. T. Hix
Assistant Examiner—William B. Perkey
Attorney, Agent, or Firm—Fitzpatrick, Cella, Harper & Scinto

[57] ABSTRACT

A camera in which a shutter device is charged in response to film wind-up and is released by shutter operating means to effect exposure, and including a change-over device displaceable for setting a film transport mechanism corresponding to each of film wind-up and rewind conditions, comprises means for preventing the operation of the shutter device in response to the displacement of the change-over device for setting the film transport mechanism in film rewind condition.

4 Claims, 6 Drawing Figures

ERRONEOUS EXPOSURE PREVENTING DEVICE

BACKGROUND OF THE INVENTION

1. Field of the Invention

This invention relates to an erroneous exposure preventing device of a camera which prevents an exposed film from being carelessly exposed again at the time of film rewind operation.

2. Description of the Prior Art

Conventionally, a camera is well-known in which when a shutter button is depressed at the time of rewind operation, a shutter device is operated, but shutter curtain is running in its closed condition.

The conventional camera of this type is so designed that a second exposure of an exposed film may be prevented even if the shutter button is depressed at rewinding operation. However, since the shutter curtain is running, there is a possibility that undesirable light reaches film surface due to the running of the shutter curtain.

SUMMARY OF THE INVENTION

It is the object of the present invention to eliminate the above-noted disadvantage and to provide an erroneous exposure preventing device for a camera which prevents an exposed film from being again exposed carelessly at the time of film rewind operation.

The present invention achieves such object by the provision of means for preventing the operation of the shutter device in response to the displacement of a displaceable change-over device for setting a film transport mechanism for a camera in a condition of film rewind, the change-over device being displaceable for setting the film transport mechanism in correspondence to each of film wind-up and film rewind conditions.

DESCRIPTION OF THE PREFERRED EMBODIMENT

An embodiment of the present invention will hereinafter be described with reference to the accompanying drawings. The camera shown in FIG. 1 comprises a camera body 1 and motor drive device 2 removably mounted thereon. A power source change-over switch 3 is automatically changed over from a power source 4 contained within the camera body 1 to a power source circuit provided in the motor drive device 2 when the motor drive device is mounted on the camera body. A half-push switch $S_1$ is operable in such a manner that it it closed when the unshown shutter button of the camera body is depressed by one stage, and a control device 5 includes an exposure control circuit, a display circuit, a release device, a shutter device, etc., and of these, the display circuit is operated by closing of the switch $S_1$ to display a pre-arranged exposure adjustment value or the like. When the shutter button is further depressed, a release switch $S_2$ transmits a release signal to the control device 5 to effect shutter release. A motor driving switch $S_3$ is adapted to be closed during the time following the operation of closing the aperture of the rearward curtain of a focal plane shutter has been started until this rearward curtain is completely closed (namely, until exposure is completed), and to be opened upon completion of film advance and shutter charge. The camera body 1 and the motor drive device 2 are coupled together by electrical contacts a, b, c, d, e and f and a mechanical coupling device (not shown) such as wind-up coupling and rewind coupling. The motor drive device 2 has a power source 6, a power source control circuit 7 including a constant voltage circuit for controlling the camera, a half-push switch $S_4$ and a release switch $S_5$. When the unshown shutter button of the motor drive device is depressed by one stage, the half-push switch $S_4$ is closed to operate the power source control circuit 7 and supply power by the control device 5 of the camera body 1 through the contact a while, at the same time, the ON signal of the switch $S_4$ is transmitted through the contact c to the control device 5 of the camera body 1 to operate the display circuit, etc. in the control device 5, whereby the prearranged exposure adjustment value, etc. are displayed. Such state is held by a hold signal being transmitted from the control device 5 through the contact b to the power source control circuit 7 for a predetermined time even if the half-push switch $S_4$ is opened, and in the meantime the photographer can see the display of the prearranged exposure adjustment value, etc. When the shutter button is further depressed, the release switch $S_5$ is closed. A comparing circuit 8, a capacitor 9 and a resistor together constitute a release timing circuit for holding the biased condition of a transistor connected to one end of the release switch $S_5$ during the opening of a selector switch $S_6$ for one-frame photography and continuous photography and for biasing said transistor each time the motor driving switch $S_3$ is opened upon completion of film advance during the closing of the selector switch $S_6$ to effect the charging of the capacitor 9. Each time it is turned on, the transistor connected to one end of the release switch $S_5$ transmits a release signal to the control device 5 through the contact d to release the shutter. Diodes 11, 12, transistor 13, capacitor 14, comparing circuit 15, transistor 16 and resistor together constitute a wind-up delaying circuit adapted to be operated upon closing of the motor driving switch $S_3$ and to put out a wind-up signal after a predetermined time (after completion of exposure). A capacitor 17, comparing circuit 18 and resistor together constitute a motor stoppage delaying circuit for receiving the wind-up signal from the wind-up delaying circuit and immediately putting out a motor driving signal and continuing to put out the motor driving signal for a predetermined time even after the motor driving switch $S_3$ is opened upon completion of the film advance so that the wind-up signal is no longer received. A transistor 19 is adapted to be turned on by the motor driving signal to effect power supply to a relay coil 20 and, when current flows to the relay coil 20, a relay contact 21 is changed over to rotate a motor 22. Transistors 27, 28, resistors 101–104 and a capacitor together constitute a positive feedback circuit which is a latch circuit for putting out a motor stop signal upon detection of a torque after completion of the film advance which will hereinafter be described. Transistors 23 and 24 together constitute a reset circuit for resetting the latch circuit. A selector switch $S_7$ is for selecting one of the wind-up and the rewind of the film and when it is closed at the contact F side, it effects the wind-up control and when it is closed at the contact R side, it effects the rewind control. A torque switch $S_8$ is normally open as will later be described and is adapted to be momentarily closed by detecting an increase in wind-up torque at the completion of the film advance or at the termination of the film, and then immediately opened. This switch $S_8$ and the aforementioned latch circuit 27, 28, 101–104 and a transistor 29 to be described together constitute a forcible stopping circuit for detecting an increase in torque and stopping the motor. A rewind stop switch $S_9$ is adapted to be closed when the film is all rewound during the film rewind and becomes disengaged from a sprocket, and this switch is opened when the film is placed on the sprocket and a back lid is closed. This switch $S_9$ is attached to the back lid of the camera and is electrically connected to the motor drive device by a contact, not shown. A transistor 32, Zener diode 34, capacitor 35, diode 36 and resistor together consitute a protective timer circuit for triggering the latch circuit and cutting off the motor current when the time during which the motor is supplied with power exceeds a predetermined time, so as to prevent the motor from being burnt or the battery from being wastefully consumed by a current continuing to flow to the motor when the torque switch $S_8$ goes wrong or when the voltage drops to render the torque switch $S_8$ inoperative. If a battery check switch $S_{10}$ is closed and when the source voltage exceeds a prescribed voltage level, a battery check circuit 38 drives LED 37 through a resistor to turn on the LED.

Figure 1:
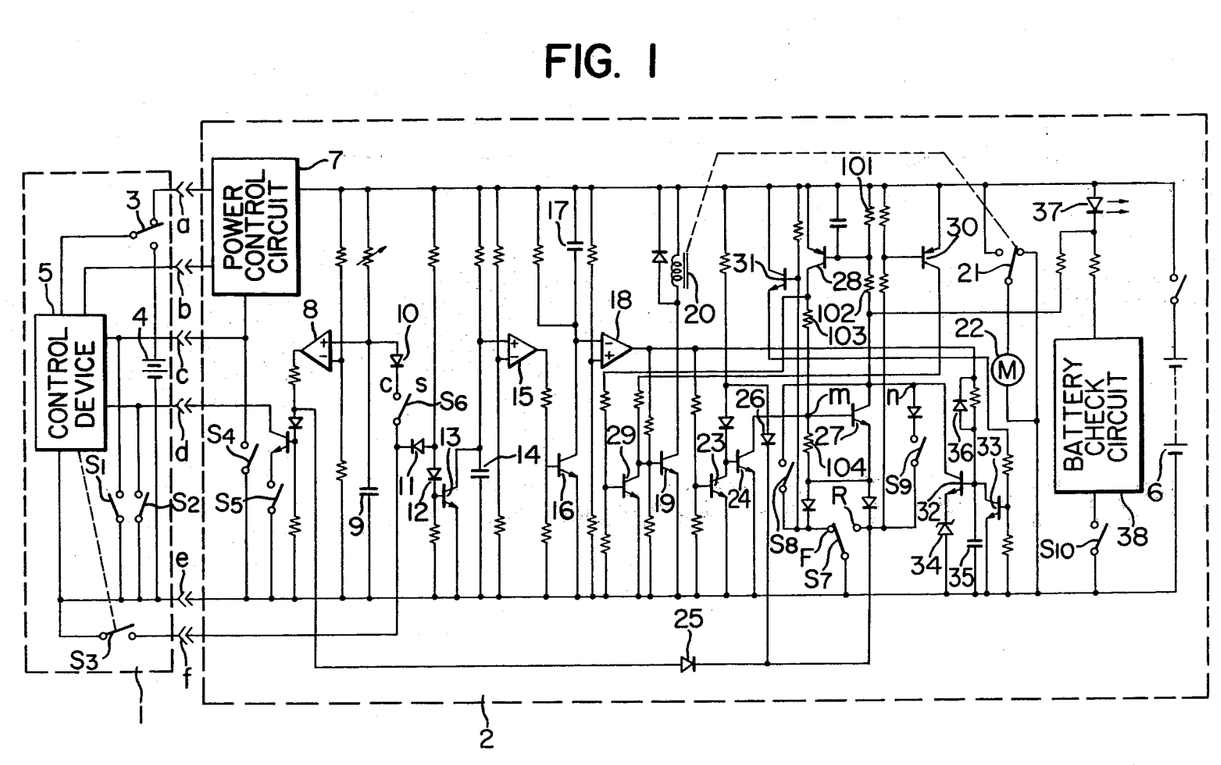
FIG. 1 is a circuit diagram showing an embodiment of the electric wind-up device for a camera according to the present invention.

In such a circuit construction, the operation is effected in the following manner. Description will first be made of a case where the motor drive device has been mounted and the switch $S_6$ has been placed at position S (OFF . . . one-frame photography) while the switch $S_7$ has been placed at position F ( . . . wind-up). Before the shutter is released, the switch $S_6$ is in OFF position and therefore, the charging of the capacitor 9 is effected and the comparing circuit 8 is biasing the transistor connected to one end of the switch $S_5$. Also, the motor driving switch $S_3$ is in OFF position and the transistor 13 is being biased to its ON state. Accordingly, the capacitor 14 of the windup delaying circuit is discharged and the output of the comparing circuit 15 has become low, so that the transistor 16 is in its OFF state and the capacitor 17 of the motor stoppage delaying circuit is discharged through a resistor parallel-connected to the capacitor 17 and the output of the comparing circuit 18 has become low. Consequently, the transistor 19 is in its OFF state and the motor has been stopped, and the transistor 23 is in its OFF state while the transistor 24 becomes turned on, so that the transistors 27 and 28 of the latch circuit are in their OFF state. That is, the latch circuit is in its reset condition. The torque switch $S_8$ is in its OFF position.

In such condition, when the unshown shutter button provided on the motor drive device is depressed to close the switches $S_4$ and $S_5$, the transistor connected to one end of the switch $S_5$ is turned on because it is biased by the comparing circuit 8, and the release signal is transmitted to the control device 5. When the shutter is released, exposure is effected and the rearward shutter curtain starts the closing operation. The motor driving switch $S_3$ is closed in response to the closing operation of the shutter and before the rearward shutter curtain completely closes the aperture. When the switch $S_3$ is closed, the bias voltage of the transistor 13 is clamped by the diode 11 and therefore, the transistor 13 becomes turned off to start the charging of the capacitor 14 and, when a predetermined time until the rearward shutter curtain completely closes the aperture elapses, the output of the comparing circuit 15 is changed to high to turn on the transistor 16. By the turn-on of this transistor 16, the wind-up delaying circuit comes to put out a wind-up signal. When the transistor 16 is turned on, the capacitor 17 is momentarily charged and the output of the comparing circuit 18 is changed to high. That is, the motor stoppage delaying circuit comes to put out a motor driving signal. When the output of the comparing circuit 18 becomes high, the transistor 23 is turned on while the transistor 24 is turned off and the latch circuit becomes operable, but since there is no trigger input of the latch circuit, the transistors 27 and 28 are in OFF state and the transistor 29 also remains in OFF state. Accordingly, the transistor 19 receives the output of the comparing circuit 18 and is turned on thereby and the relay coil 20 is electrically energized to rotate, the motor 22 while, at the same time, the capacitor 35 of the protective timer circuit starts to be charged by a resistor parallel-connected to the diode 36.

Film advance is effected by the rotation of the motor through a wind-up coupling, not shown, and since the start of rotation of the motor 22 is delayed by a predetermined time determined by the wind-up delaying circuit after the motor driving switch $S_3$ has been turned on, film transport is effected after the rearward shutter curtain has completely closed the aperture (after exposure has been completed). The film advance progresses by the motor 22 and, when the film advance is completed, the motor driving switch $S_3$ becomes open and the transistor 13 is turned on, so that the capacitor 14 is momentarily discharged and the output of the comparing circuit 15 is changed to low and the transistor 16 becomes turned off. However, even if the transistor 16 becomes turned off, the capacitor 17 is discharged little by little by a parallel-connected resistor and therefore, the output of the comparing circuit 18 is not immediately varied but maintains its high condition for a predetermined time after the switch $S_3$ has become open (at least, for the time until the latch circuit to be described is operated), and the motor 22 continues to rotate with the transistor 19 remaining in ON state.

On the other hand, when the film advance is completed, a film advance device such as an unshown sprocket on the camera body side is retained immovably, but the motor continues to rotate and therefore, the film advance torque is increased. Then, a torque detecting mechanism to be described is operated and the torque switch $S_8$ is momentarily closed. By the closing of the torque switch $S_8$, a trigger signal is applied to a junction n to trigger the latch circuit and turn on the transistors 27 and 28. That is, a motor stopping signal is generated. Thereby, the transistor 29 is turned on and in spite of the fact that the output of the comparing circuit 18 is high, the transistor 19 is turned off to cut off the power supply to the relay coil 20 and forcibly stop the motor 22. After the latch circuit has been triggered by the switch $S_8$, the discharging of the capacitor 17 progresses and the output of the comparing circuit 18 is changed to low to turn off the transistor 23 and turn on the transistor 24, so that a reset signal is applied to a junction m to reset the latch circuit and the transistors 27, 28 and 29 are turned off and the transistor 19 maintains its OFF state. The aforementioned predetermined time until the output of the comparing circuit is reversed is equal to or a little longer than the time from after the film advance in the camera has been completed during the lowest voltage allowable for the specification of the motor drive device until the torque switch $S_8$ is closed.

The protective timer circuit constituted by the transistor 32, Zener diode 34, capacitor 35, diode 36 and resistor is not operated within the ordinary wind-up time and, when the output of the comparing circuit 18 has been changed to low, the charge stored in the capacitor 35 is quickly discharged by the diode 36.

During the time that the latch circuit is operated, namely, during the time following closure of the torque switch $S_8$ until the output of the comparing circuit 18 is reversed to reset the latch circuit, LED 37 is turned on to enable it to be monitored that the torque switch $S_8$ is properly operated. In this manner, one-frame photography and the next one-frame film advance are terminated. Even if the shutter button (not shown) of the motor drive device remains depressed, the transistor connected to one end of the switch $S_5$ maintains its ON position and therefore, the next release signal is not applied to the control device 5.

Description will now be made of the operation in a case where the switch $S_6$ has been brought to position C (ON . . . continuous photography).

When the switch $S_6$ is in ON position, a first frame photography and the next frame film advance are also effected in the same manner as previously described. However, when the motor driving switch $S_3$ is in ON position, the discharging of the capacitor 9 is effected through a reverse current blocking diode 10 and a contact f. Accordingly, the output of the comparing circuit 8 changes to low and the transistor connected to this output end is once turned off. When the motor driving switch $S_3$ is opened upon completion of the film advance, the capacitor 9 again starts to be charged and, after a predetermined time, for example, after the motor 22 has been stopped, the output of the comparing circuit 8 constituting a release timing circuit is changed to high and, if the release switch $S_5$ is in its ON position at that time, the transistor biased by the output of the comparing circuit is turned on to again transmit the release signal to the control device 5, thus effecting shutter release and continuous photography. By varying a variable resistor for charging the capacitor 9 which determines the release timing, the photographing frame speed during continuous photography can be determined as desired.

When the film take-up progresses and the terminal end of the film is reached, the wind-up device of the camera body can no longer draw the film out of the magazine and, due to the stoppage of the sprocket, the wind-up device of the camera body usually becomes immovable before the film advance is completed. However, even if the wind-up device is stopped, the motor driving switch $S_3$ is in ON position and the motor 22 tries to rotate. Then, the torque switch $S_8$ is operated by an increase in film advance torque and is momentarily closed to trigger the latch circuit and stop the motor 22. Since the switch $S_3$ remains in ON position, the output of the comparing circuit 8 is maintained high and the transistor 24 of the reset circuit is maintained in OFF state and the ON state of the transistors 27 and 28 of the latch circuit is maintained, whereby the entire sequence is stopped with the LED 37 continuously turned on, thus indicating that the film has come to its terminal end.

In a case where the torque switch $S_8$ becomes inoperable due to the insufficient motor drive force resulting from the source voltage drop at the termination of the film or where the torque switch $S_8$ goes wrong and does not operate, the protective timer circuit causes the turn-on of the transistor 32, the triggering of the latch circuit and the turn-on of the transistor 29 in succession when the charging potential of the capacitor 35 exceeds the threshold voltage determined by the voltage of the Zener diode 34 and the base-emitter voltage of the transistor 32 in a predetermined time after the switch $S_3$ has been closed, thereby stopping the power supply to the motor 22 and turning on the LED 37.

The operation during the film rewind will now be described. The film rewind is accomplished by changing over the switch $S_7$ to the contact R side. The change-over of the switch $S_7$ is effected in the following manner. When a wind-up and rewind change-over lever, not shown, is changed over from the wind-up side to the rewind side, a drive gear and a wind-up gear train are first disconnected from each other, and then the switch $S_7$ moves away from its contact F to its neutral position and in response thereto, a rewind button, not shown, is operated to make the sprocket free. The switch $S_7$ is further changed over from its neutral position to its contact R and at last, the drive gear becomes coupled to the rewind gear train to enable the rewind to take place. The above-described series of operations are continuously effected by one operation of changing over the wind-up and rewind change-over lever to the rewind side, and the change-over from the rewind to the wind-up is effected in the order reverse to that described above. The change-over operation for the rewind may take place in two cases, namely, in a case where the motor 22 is stopped before the camera completes the wind-up operation and in a case where the motor is stopped when the camera has completed the wind-up operation. The rewind from the condition before the wind-up operation is completed is effected in the following manner. As previously described, at the termination of the film, it is often the case that the camera is stopped with the wind-up operation not yet completed, and in such case, the motor driving switch $S_3$ is in ON position and the output of the comparing circuit 18 is high and the transistors 27 and 28 of the latch circuit are turned on by the operation of the torque switch $S_8$. In such condition, when the wind-up and rewind change-over lever is moved to change over the switch $S_7$ from its contact F to its neutral position, the transistors 27 and 28 are turned off to reset the latch circuit and the transistor 29 is turned off, so that the transistor 19 is turned on to start to rotate the motor. At the same time, the transistor 31 is biased and turned on, so that the transistor 33 is turned on and the discharging of the capacitor 35 is effected to reset the protective timer circuit. The transistor 33 is turned off. At this time, the drive gear meshes with neither of the wind-up gear train and the rewind gear train and therefore, neither of wind-up and rewind does not yet take place. When the switch $S_7$ is connected to its contact R side, the latch circuit becomes ready to operate, but the aforementioned rewind stop switch $S_9$ is in OFF position because the film has not yet been rewound, and accordingly, the latch circuit is not triggered. Further, when the change-over lever is completely changed over to the rewind side, the drive gear and the rewind gear train come into mesh engagement to effect the rewind. When the film rewind progresses and the leading end of the film is disengaged from the sprocket (or the take-up spool) of the camera, namely, when the film rewind is terminated, the rewind stop switch $S_9$ is closed to apply a trigger signal to the junction n and trigger the latch circuit and the transistor 29 is turned on, so that the transistor 19 is turned off to stop the motor and turn on the LED 37, which thus displays the termination of the rewind. In such condition, even if the back lid of the camera is opened to remove the film therefrom and the rewind stop switch $S_9$ is opened, the once triggered latch circuit maintains its operation and the motor 22 is not rotated. Where design is made such that, for example, the rewind coupling is retracted from the magazine chamber during the film advance in response to the wind-up and rewind change-over lever and said coupling comes into the magazine chamber during the rewind, if the wind-up and rewind change-over lever is brought down to the wind-up side to remove the magazine from the magazine chamber after completion of the rewind and the rewind coupling is retracted from the magazine chamber, the switch $S_7$ becomes connected to the contact F. Where such a design is adopted, the latch circuit is reset when the switch $S_7$ has been brought to its neutral position, and the motor driving switch $S_3$ remains in its ON position and therefore, the motor 22 is driven until the wind-up operation is completed, whereupon the motor is stopped, but by this time, the rewind has already been completed and the engagement between the sprocket and the perforations of the film has been released and thus, the exposed film is not again drawn out of the magazine. Loading of unexposed film may be done thereafter.

Next, the rewind when the motor is stopped with the camera having completed the wind-up operation is effected in the following manner.

Since the wind-up operation has been completed, the motor driving switch $S_3$ is in OFF position and accordingly, the output of the comparing circuit 8 is low. Even if the wind-up and rewind change-over lever is changed over to the rewind side and the switch $S_7$ is disengaged from the contact F, the transistor 19 is turned off by the output of the comparing circuit 18 at this time and therefore, the motor 22 is not yet rotated. When the switch $S_7$ is connected to the contact R, the transistor 30 is turned on and thereby the transistor 19 is turned on, so that the motor 22 is rotated. At the same time, the bias of the transistor 24 is clamped by the diode 26, so that the transistor 24 is turned off and the latch circuit becomes operable. When the wind-up and rewind change-over lever is completely changed over to the rewind side, the drive gear and the rewind gear train come into mesh engagement as already described, to effect the film rewind. The operation thereafter is the same as what has been described previously. After completion of the rewind, when the wind-up and rewind change-over lever is returned to its initial position and the switch $S_7$ is disengaged from the contact R, the latch circuit is reset because the camera is in the wind-up completed condition and, at the same time, the transistor 30 is turned off, so that the bias source of the transistor 19 becomes exhausted and the motor remains stopped and such condition remains unchanged even if the switch $S_7$ is connected to the contact F.

FIG. 1 is an embodiment wherein occurrence of release signal is prevented when the switch $S_7$ is connected to the contact R, namely, in a rewind state. However, when the shutter button of camera body side is depressed to close the switch $S_2$, the release signal is transmitted to the control device 5.

Figure 4:
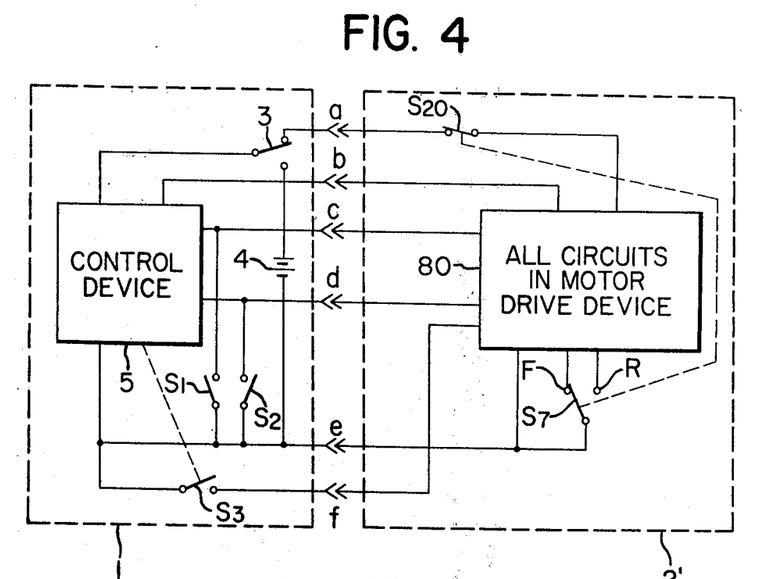
FIG. 4 is a block schematic diagram showing a second embodiment improving over the embodiment of FIG. 1.

FIG. 4 is an embodiment for overcoming this disadvantage.

In FIG. 4, all the circuits included in the motor drive device 2 of FIG. 1 are designated by numeral 80. The embodiment shown in FIG. 4 has the same structure as that shown in FIG. 1 except for the provision of a switch $S_{20}$.

It is noted that the junction from the output of the comparing circuit 8 to the contact R and the diode 25 may be eliminated. When the switch $S_{20}$ which is operatively associated with the switch $S_7$ is connected to the contact R, namely, the rewind is effected, the switch $S_{20}$ is open. Accordingly, at the time of rewinding, the power line through which power is applied from the motor drive device to the camera body is cut off, so that even if the shutter button on the camera body side is depressed to close the switch $S_2$, the control device 5 is not operated and a shutter device is not operated. Therefore, during film rewinding operation, the shutter is not open at all and is not running in closed condition.

The same takes place even when the release switch $S_5$ on the motor drive device side is closed.

In this embodiment, the switch $S_{20}$ corresponds to means for preventing the operation of the shutter device.

Figure 5:
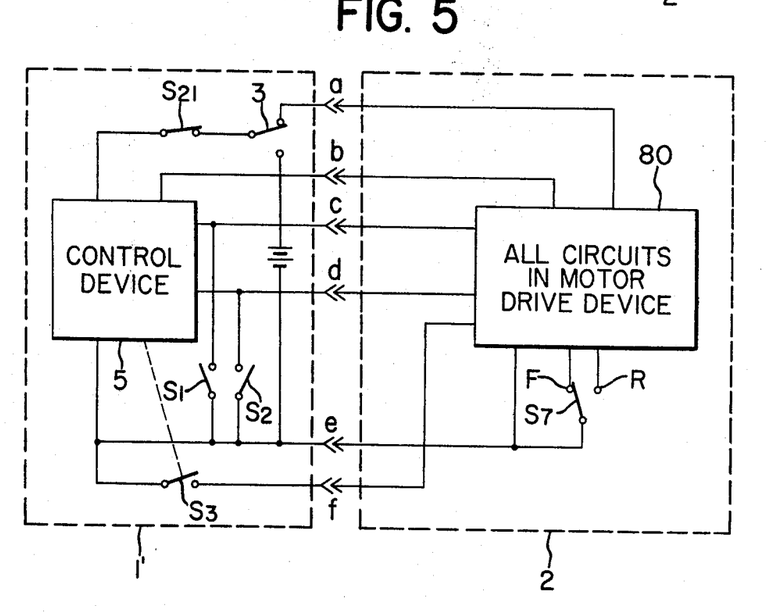
FIG. 5 is a block schematic diagram showing a third embodiment improving over the embodiment of FIG. 1.

The embodiments described so far are examples of a case where rewind mode is set on the motor drive device side. FIG. 5 is an embodiment wherein when the camera body is disconnected from the motor drive device and the rewind operation is effected, the operation of the shutter device can be prevented.

The difference between the embodiments in FIGS. 5 and 4, is the change of the switch $S_{20}$ to $S_{21}$.

The switch $S_{21}$ is operatively associated with the rewinding button of the camera body and closed when the rewinding button is operated to make a sprocket, not shown, free. The rewinding button becomes ready to be operatively associated with a wind-up and rewind change-over lever, not shown, of unshown motor drive device when the motor drive device is mounted to the camera body.

Accordingly, when the wind-up and rewind change-over lever is operated to connect the switch $S_7$ to the contact R the rewinding button which is engaged with the change-over lever is operated to open the switch $S_{21}$, so that power is not applied from the motor drive device side to the control device 5 of the camera body.

Therefore, the shutter device is not operated and the same effect as that of the embodiment of FIG. 4 can be obtained. Also, since in this embodiment, the switch $S_{21}$ is provided on the camera body side, the operation of the rewinding button causes the switch $S_{21}$ to be open, when the camera body is disconnected from the motor drive device and the rewind is effected. Accordingly, even when the shutter button is depressed to close the switch $S_2$ at the time of rewinding with the switch 3 changed over to the power source 4 side, the shutter device is not operated at all, so that the shutter is not open and is not running in a closed condition. In this embodiment, wind-up and rewind change-over lever or rewinding button is means which displaces in response to take-up and rewinding operation and the switch S21 corresponds to means for preventing the operation of the shutter device.

Figure 6:
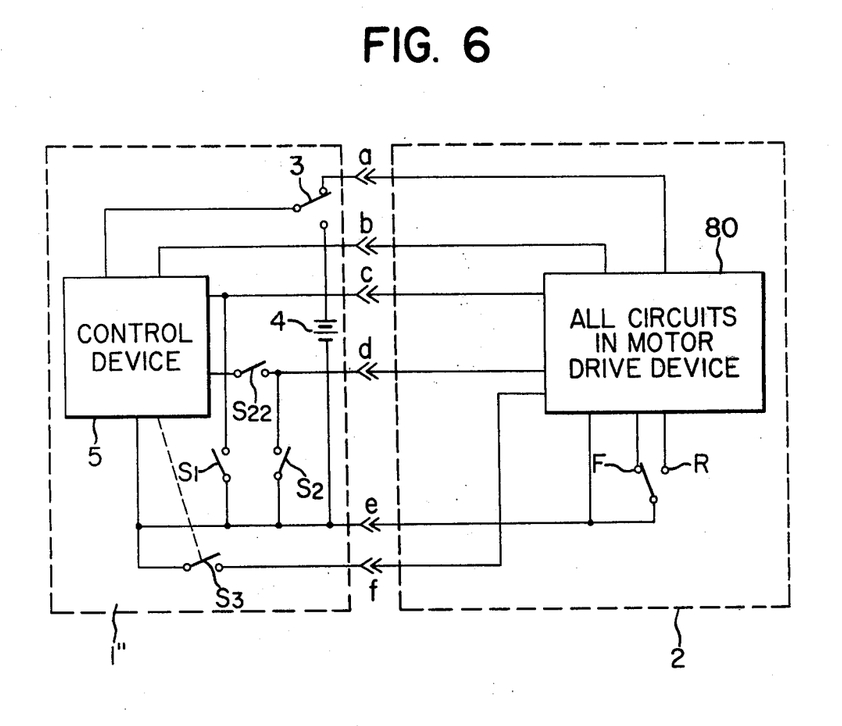
FIG. 6 is a block schematic diagram showing a fourth embodiment improving over the embodiment of FIG. 1.

An embodiment of FIG. 6 is different from that of FIG. 5 in the provision of the switch S22 instead of the switch S21. The switch S22, like the switch S21, is operatively associated with the rewinding button of the camera body. The switch S22 is for preventing the release signal generated by the closing of the switch S2 from being transmitted to the control device 5, so that shutter device is not operated. In this embodiment, the switch S22 corresponds to means for preventing the operation of the shutter device.

The above-described device is designed such that when the rewind is effected with the switch S7 changed over to the contact R side the bias of the transistor connected to the output of the comparing circuit 8 is clamped by the diode 25 to thereby prevent the release signal from being transmitted to the camera body even if the release switch S5 is closed.

Accordingly, even if the film rewind is effected with the wind-up operation being completed (because in an ordinary camera shutter release operation becomes ready to be effected after the wind-up has been completed) and the shutter button is depressed, by mistake during the rewinding operation to thereby close the release switch S5, it would not take place for the shutter device to be actuated and for the shutter to be released. There is not the slightest fear of the phototaken film being again exposed and of the shutter which is kept closed running thus resulting in undesirable light reaching the film surface.

In this embodiment, the connecting line between the output of the comparing circuit 8 and the contact R, and the diode 25 together constitute means for preventing the operation of the shutter starting device.

Figure 2:
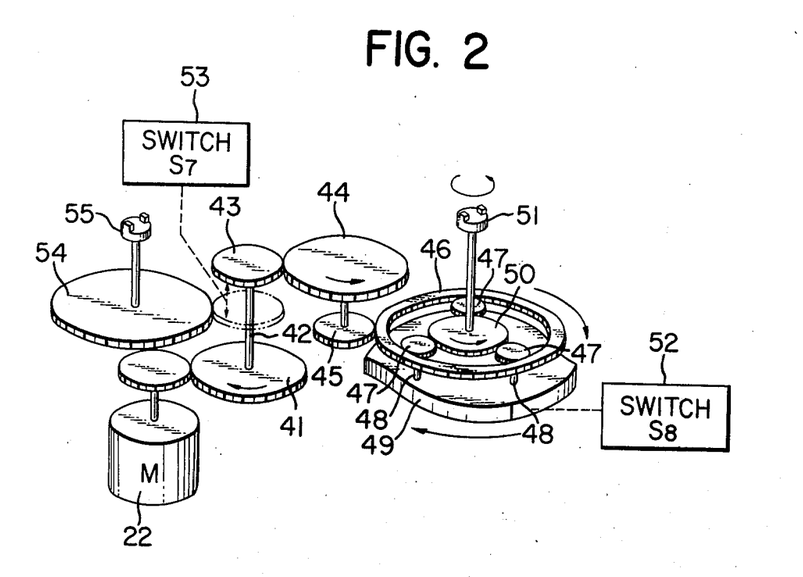
FIG. 2 is a perspective view showing an example of the operating mechanism for a torque switch.
Figure 3:
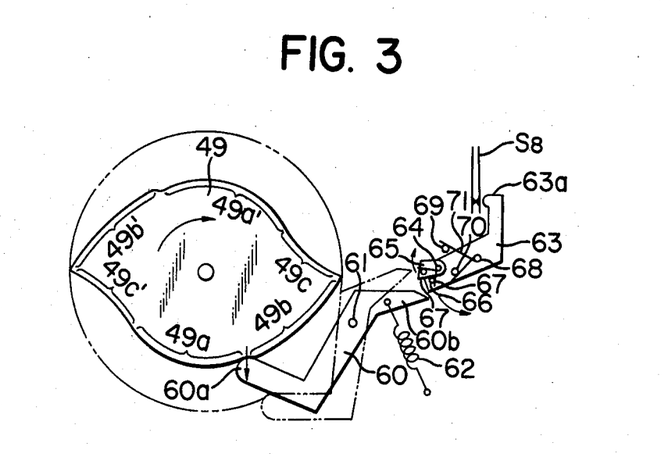
FIG. 3 is a plan view showing a specific example of the torque detecting mechanism.

FIGS. 2 and 3 show an example of the operating mechanism for the torque switch in the circuit described in connection with FIG. 1. In FIG. 2, an axially slidable gear 43 is provided on a shaft 42 driven by a gear 41 which normally meshes with a motor pinion gear. The gear 43 is rotatable with the shaft 42, but the axial position thereof is determined by the wind-up and rewind change-over lever which operates the switch S7. The solid-line position of the gear 43 in which it is in mesh engagement with a gear 44 is the position during the wind-up condition and, when the rewind condition is brought about, the gear 43 comes to assume a position indicated by phantom lines, in which the gear 43 meshes with a gear 54 to transmit the drive force to a rewind coupling 55 connected to the rewind device (not shown) of the camera body. The switch S7 is disengaged from the contact R side of FIG. 1 at a position in which the gear 43 becomes disengaged from the gear 44 during the displacement of the gear 43 from its solid-line position to its phantom-line position, and the switch S7 becomes connected to the contact R side before the gear 43 meshes with the gear 54.

The drive force transmitted by the mesh engagement between the gears 43 and 44 is further transmitted through a gear 45, a gear 46, gears 47 and a gear 50 to a wind-up coupling 51 coupled to the wind-up device (not shown) of the camera body. The gear 46 has external teeth meshing with the gear 45 and internal teeth meshing with the gears 47, and the shafts 48 of the gears 47 are supported on a cam plate 49 formed coaxially with the gears 46 and 50. The gears 46, 47 and 50 to- gether constitute a planetary gear mechanism. A cam is formed on the end surface of the cam plate 49, and a torque detecting mechanism 52 which is in contact with the cam operates the torque switch $S_8$. That is, the rotation of the motor 22 is transmitted to the gear 46 when the gear 43 is in mesh engagement with the gear 44, so that the gear 46 is rotated clockwisely, and the gear 50 and the coupling 51 try to rotate counterclockwisely through the gear 47 and the cam plate 49 tries to rotate clockwisely through the shafts 48. During the wind-up operation, the rotational force of the gear 44 is divided into a force for driving the coupling 51 and a force for driving the cam plate 49, and a relatively small rotational force is transmitted to the cam plate 49. Consequently, when a relatively small rotational force is being applied to the cam plate 49, the torque detecting mechanism 52 may block the rotation thereof and, when the sprocket stops rotating due to the completion of the film advance and the rotation of the wind-up coupling 51 is blocked to increase the rotational force of the cam plate 49, the torque detecting mechanism 52 may detect such rotational force and operate the torque switch $S_8$. A specific example of the torque detecting mechanism 52 described above will now be explained by reference to FIG. 3. The cam surface of the above-described cam plate 49 has arcuate portions 49a and 49a' each having a small radius, and cam portions 49b, 49b', 49c and 49c'. A first lever 60 contacting the cam surface is rotatable about a pivot 61 and biased for clockwise rotation by a spring 62 having one end fixed, so that the fore end 60a of the first lever contacts the cam plate 49. A second lever 63 is rotatable about a pivot 68, and a spring 71 is hooked between a spring engaging pin 70 provided on the second lever and the rotation stopping pin 69 of the second lever, and the second lever is biased for clockwise rotation and retained by the rotation stopping pin 69. A third lever 65 rotatable about a shaft 64 provided on the second lever has a spring 72 hooked between a spring engaging pin 67 on the third lever and a rotation stopping pin 66 provided on the second lever, and the third lever is biased for counter-clockwise rotation and retained by the rotation stopping pin 66. The fore end of the third lever and the end 60b of the first lever are engageable with each other. The end 63a of the second lever 63 is designed to close the torque switch $S_8$ when this lever has been rotated counter-clockwisely. The solid lines show the state in the course of the film advance of the camera and in this state, a clockwise rotational force is being transmitted to the cam plate 49. However, with the rotation of the cam plate 49 being blocked by the engagement between the riser portion of the cam formed between 49a and 49b and the fore end 60a of the first lever biased by the spring 62, only the wind-up coupling 51 is rotated to effect the film advance. When the wind-up device including the sprocket, etc. is stopped due to the completion of the film advance, the coupling 51 stops rotating and therefore, the rotational force transmitted to the cam plate 49 is sharply increased and that force becomes greater than the retaining force of the first lever 60 and thus, the cam plate 49 is rotated clockwisely and with this rotation, the first lever 60 is rotated counter-clockwisely by the cam portion 49b and the first lever is rotated to a position indicated by dots-and-dash line. During the time that it is driven to the dots-and-dash line position, the end 60b of the first lever interferes with the fore end of the third lever 65, but at that time, the second lever 63 is retained by the rotation stopping pin 69 and thus, it is immovable and only the third lever 65 is rotated clockwisely. Since design is made such that the end 60b of the first lever and the fore end of the third lever 65 pass the interference area before the first lever reaches its dots-and-dash line position, the third lever returns to a position in which it is again retained by the rotation stopping pin 66, with the aid of the spring 72. The cam plate 49 further continues to rotate and, when the fore end 60a of the first lever comes into contact with the cam portion 49c, the first lever 60 is rotated clockwisely by the spring 62 and the end 60b of the first lever again interferes with the fore end of the third lever to try to move the third lever counter-clockwisely. However, the rotation of the third lever 65 is blocked by the rotation stopping pin 66 and therefore, that force also rotates the second lever 63. Accordingly, the torque switch $S_8$ is closed by the end 63a of the second lever and the motor 22 tries to stop as already described, but even if an electromagnetic brake is applied to the motor 22, the motor 22 is not momentarily stopped and continues to rotate a little, whereby the fore end 60a of the first lever 60 comes into contact with the arcuate portion 49a' having the same radius as that of the arcuate portion 49a. Also, during the time that the fore end 60a returns to the position in which it contacts the arcuate portion 49a', the end 60b passes the interference area with the fore end of the third lever 65 and thus, the second lever is retained by the rotation stopping pin 69 as shown. The torque switch $S_8$ comes back to its open position. In such condition, if the release button has not been depressed, the motor is stopped. Thereafter, when the shutter is released to effect exposure, the motor driving switch $S_3$ is closed and the rotational force is again transmitted to the cam plate 49 and, during the time that the film is advanced, the fore end 60a of the first lever 60 slides on the arcuate portion 49a' of the cam plate and as already described, the cam plate 49 and the fore end 60a of the first lever 60 come into engagement at the boundary between 49a' and 49b'. After the completion of the film advance, when the rotational force of the cam plate 49 is increased, the cam plate 49 is again rotated clockwisely from the position of FIG. 3.

In the above-described embodiment, an integration circuit is used as the wind-up delaying circuit and, when the output of this integration circuit has reached a predetermined value, the motor is driven. When the motor is thus driven, even if chattering occurs during the closing of the motor driving switch $S_3$, there is no possibility that the motor is thereby driven in a pulse-like manner to create noise. Accordingly, malfunctioning can be prevented.

Also, the present invention need only be an electric wind-up device and includes a so-called "auto winder" in addition to the motor drive device.

Further, the embodiment has been described with a focal plane shutter taken as an example, whereas the present invention can also be adopted for a lens shutter and may be a device which is operatively associated with the closing operation of the lens shutter and moreover, detects that this shutter is in the condition before completion of exposure and puts out a wind-up signal in a predetermined time after this point of time to thereby effect the wind-up operation.

I claim:

1. In a camera including a shutter curtain which is capable of opening an aperture for exposure during the movement from a shutter charged position to a shutter released position, a shutter starting device for displacing the shutter curtain from the shutter charged position to the shutter released position by a shutter release operation, and a film transport mechanism for alternatively effecting film wind-up and film rewind operations, the wind-up operation including the feeding of unexposed film in a film supply chamber to a film receiving chamber after an exposure operation and the rewind operation including the transport of the exposed film in the film receiving chamber to the film supply chamber, and having a change-over device for the selection operation, the improvement comprising:
   means for preventing the operation of said shutter starting device in response to the operation of said change-over device for selecting the operation of said film transport mechanism in film rewind condition, and
   a power supply circuit for said shutter starting device and wherein said preventing means includes a switch which is capable of preventing the supply of energy from said power supply circuit.

2. In a camera including a shutter curtain which is capable of opening an aperture for exposure during the movement from a shutter charged position to a shutter released position, a shutter starting device for displacing the shutter curtain from the shutter charged position to the shutter released position by a shutter release operation, and a film transport mechanism for alternatively effecting film wind-up and film rewind operations, the wind-up operation including the feeding of unexposed film in a film supply chamber to a film receiving chamber after an exposure operation and the rewind operation including the transport of the exposed film in the film receiving chamber to the film supply chamber, and having a change-over device for the selection operation, the improvement comprising:
   means for preventing the operation of said shutter starting device in response to the operation of said change-over device for selecting the operation of said film transport mechanism in film rewind condition, and
   means for emitting a release signal for causing said shutter starting device to respond to said shutter release operation and said preventing means including means for preventing the generation of said release signal.

3. In a camera having a camera body and an electric driving device connectable to said camera body by connecting means wherein said camera body includes a shutter curtain capable of opening an aperture for exposure during the movement from a shutter charged position to a shutter released position, a shutter starting device for displacing the shutter curtain from the shutter charged position to the shutter released position by a shutter release operation, and a film transport mechanism for alternatively effecting film wind-up and film rewind operations, the wind-up operation including the feeding of unexposed film in a film supply chamber to a film receiving chamber after an exposure operation and the rewind operation including the transport of the exposed film in the film receiving chamber to the film supply chamber, and wherein said electric driving device includes a changeover device for alternatively driving said film transport mechanism by a motor, the improvement wherein said electric driving device comprises:
   means for acting on said shutter starting device through said connecting means so as to prevent the operation of said shutter starting device in association with the operation of said change-over device for selecting the operation of said film transport mechanism in film rewind condition, and a power supply circuit for supplying energy to said shutter starting device through said connecting means and wherein said acting means includes a switch which is capable of preventing transmission of an energy supply from said power supply circuit.

4. In a camera having a camera body and an electric driving device connectable to said camera body by connecting means wherein said camera body includes a shutter curtain capable of opening an aperture for exposure during the movement from a shutter charged position to a shutter released position, a shutter starting device for displacing the shutter curtain from the shutter charged position to the shutter released position by a shutter release operation, and a film transport mechanism for alternatively effecting film wind-up and film rewind operations, the wind-up operation including the feeding of unexposed film in a film supply chamber to a film receiving chamber after an exposure operation and the rewind operation including the transport of the unexposed film in the film receiving chamber to the film supply chamber, and wherein said electric driving device includes a change-over device for alternatively driving said film transport mechanism by a motor, the improvement wherein said electric driving device comprises:

means for acting on said shutter starting device through said connecting means so as to prevent the operation of said shutter starting device in association with the operation of said change-over device for selecting the operation of said film transport mechanism in film rewind condition, an operation device for said shutter release operation and means for generating a release signal for causing said shutter starting device to respond to said operation device and wherein said acting means includes means for preventing the generation of said release signal.

* * * * *